(No Model.)
C. G. BJORLIN.
CENTRIFUGAL APPARATUS FOR COOLING OR HEATING LIQUIDS.
No. 476,441.  Patented June 7, 1892.
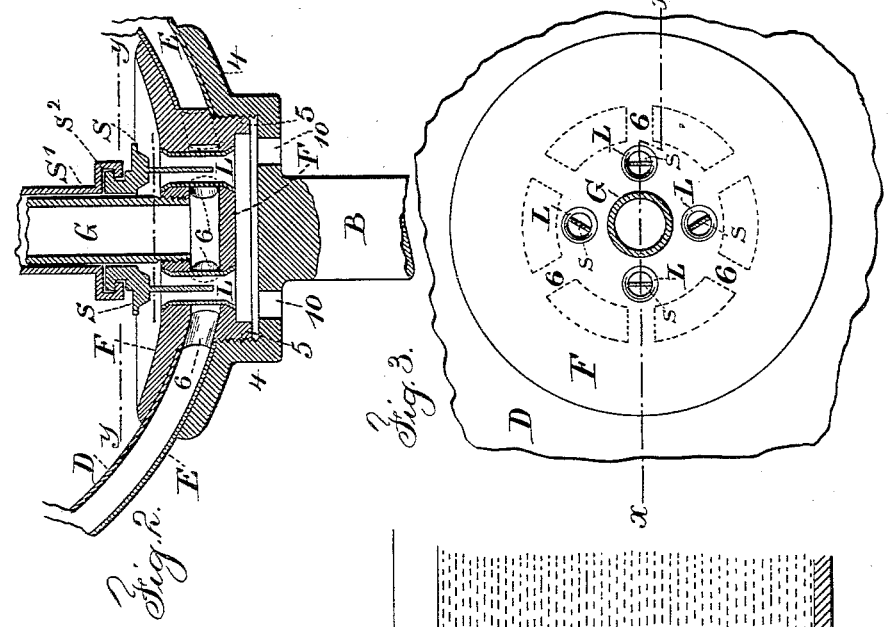
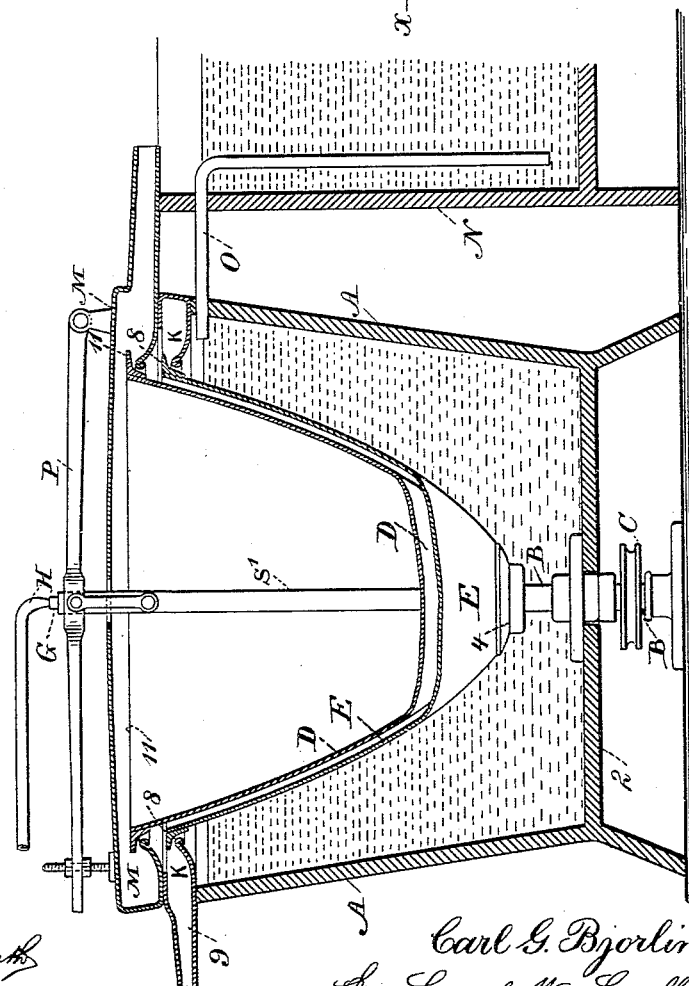
Witnesses
Chas. H. Smith
J. Staib
Inventor
Carl G. Bjorlin
per Lemuel W. Serrell
Atty

UNITED STATES PATENT OFFICE.

CARL G. BJORLIN, OF STOCKHOLM, SWEDEN, ASSIGNOR TO HIMSELF, AND RICHARD DUNCAN HARRIS, OF NEW YORK, N. Y.

CENTRIFUGAL APPARATUS FOR COOLING OR HEATING LIQUIDS.

SPECIFICATION forming part of Letters Patent No. 476,441, dated June 7, 1892.

Application filed October 19, 1891. Serial No. 409,116. (No model.)

*To all whom it may concern:*

Be it known that I, CARL GEORG BJORLIN, a citizen of Sweden, residing in Stockholm, Sweden, have invented an Improvement in Centrifugal Apparatus for Cooling or Heating Liquids, of which the following is a specification.

This invention is primarily intended for rapidly cooling milk or other liquids; but it may be availed of in applying heat to such liquids. I make use of two similarly-shaped vessels with a narrow space between them, such vessels being rotated together, and the fluid to be cooled is supplied axially and passes by the centrifugal action between the two vessels and is delivered from the edge of the outer vessel into a pan or receiver, and the cooling liquid is caused to flow through the inner vessel by the centrifugal action, and for cooling purposes such liquid passes from a refrigerating or ice-holding vessel through the improved apparatus and is returned to such ice-holding vessel; but for heating purposes any suitable apparatus is made use of in place of the ice-holding vessel for heating the circulating liquid.

In the drawings, Figure 1 is an elevation, partially in section, of the improved apparatus. Fig. 2 is a section in magnified size at the line *x x* of Fig. 3 of the spindle and connections to the respective sheet-metal vessels, and Fig. 3 is a sectional plan at the line *y y* of Fig. 2.

A tank or box A is provided, the same being of a suitable size and having a spindle B, central, or nearly so, to such vessel, and where this spindle is driven from below it passes through the bottom 2 of the vessel A and is surrounded by a suitable packing or bearing, and it is driven by a pulley or wheel C, or, if desired, the spindle may be supported from above the vessel A and rotated by a pulley around the same. The sheet-metal vessels D and E are circular and similar in shape, and it is preferable to make these vessels parabolic in section, as represented, in order that the centrifugal action may be progressive and nearly uniform, and the liquid acted upon will be a hollow figure similar to the concavity in a mass of water having a rapid rotary movement.

At the end of the spindle B is a flaring cup 4, adapted to receive the central portion or lower end of the sheet-metal vessel E, and such sheet-metal vessel may be soldered, brazed, or otherwise permanently attached to the flaring cup 4, and there is a cylindrical portion to this cup 4 internally screw-threaded to receive the screw 5 upon the central piece or hub F, which rises above the flaring cup 4 and passes into the inside of the sheet-metal vessel D and is permanently connected thereto, as shown in Fig. 2, by rivets, soldering, or brazing, and when the hub F is screwed into the cup 4 the vessels D and E are concentric, there being a space or annular channel between the said vessels D and E that is adapted to the passage of the liquid that is to be cooled.

The hub F is hollow, and there is an axial pipe G in line with the spindle B or forming such spindle in cases where the spindle passes above the vessels D and E, and this axial pipe opens at its lower end into the space within the hollow hub F, and there are lateral openings 6 through the hub and into the space between the vessels D and E, so that milk or other liquid supplied to the axial pipe G by a spout H or otherwise will pass down this axial pipe G into the hollow hub F and through the opening 6 into the space between vessels D and E, and by the rapid rotation of such vessels the liquid will be thrown outwardly and spread in a comparatively thin film on the inner surface of the parabolic vessel E and be delivered over the top edge 8 into an annular trough or cover K, having a spout 9 at one side, from which such liquid materials will flow into any suitable receiving-vessel. There are one or more short pipes L, passing vertically, or nearly so, through the hollow hub F, and there are openings 10 through the bottom of the flaring cup 4, so that water or other liquid contained in the tank or box A can pass through these openings 10 and through the pipes L into the interior of the vessel D. Hence the water or other liquid in the tank or box A may rise in the vessel D to the same height as it stands in the tank A, and when the vessels D and E and spindle are rotated the centrifugal action will throw the liquid out of the vessel D over the edge 11 thereof into the annular trough or cover M, from which it can run back into the vessel N, and there is a pipe O, passing from the vessel N into the tank A at or about the water-line, and the pipe O preferably descends in the vessel N to near the bottom, so that when water is supplied into the vessel N it flows through the pipe O into the vessel A; but the cooler water is taken from the bottom of such vessel N, and there is a circulation of water maintained by the centrifugal action of the apparatus, and the water remains in the vessel N a sufficient length of time to become properly cooled by the ice or other refrigerating device employed in connection with the vessel N for cooling such water, and in cases where heat is to be applied this vessel N is to be heated in any desired manner, and the hot water will pass by the pipe O into the tank A and through the holes 10, pipe L, into the vessel D, and be discharged centrifugally from the edge 11 and be returned by the trough M to the vessel N, so as to circulate through the apparatus.

It is often advantageous to regulate the quantity of water flowing through the pipe L and centrifugal vessel D, and for this purpose a valve S may be applied to the pipe L, such valve being of any desired character—such, for instance, as an india-rubber disk. I have represented several pipes L as passing through the hollow hub F and valves S, corresponding in number to such pipes L, and these valves S are connected with a sleeve or ring $S^2$ around the axial pipe G, and this sleeve $S^2$ has a peripheral groove for the reception of an adjusting-tube S', which extends up the axial pipe G to a convenient place where it can be raised or lowered by a lock-nut around the axial pipe G, or by a lever P or any other suitable mechanism, and by this means the flow of water into the vessel D can be regulated at the pipe or pipes L, and this regulation is independent of the height of the water that surrounds the vessel E, and it is usually preferable to allow the water in the tank A to stand at the same height, or nearly so, as it is in the vessel N, in order that the liquid may surround and be in contact with the whole or nearly the whole exterior surface of the centrifugal vessel E, and usually it is preferable to close the valve or valves S before the rotation of the centrifugal vessel is stopped, so that the liquid in the tank A will be kept out of the vessel D, and by admitting the liquid to the vessel D, after the centrifugal apparatus has been set in rotation, the liquid will follow along the interior surface of the vessel D in a comparatively thin strata or film and be discharged from the edge 11 of such vessel D.

I claim as my invention—

1. The combination, with a tank or box A, of two similar centrifugal sheet-metal vessels D E, a spindle to which such vessels are connected and means for rotating the same, an axial pipe opening into a hollow portion or hub in the spindle, there being openings through this hub into the space between the two sheet-metal vessels and tubular openings at such hub for the passage of liquid from the tank into the inner vessel of the centrifugal vessels, and annular troughs or covers for receiving the liquids from the edges of the centrifugal vessels, substantially as set forth.

2. The combination, with a tank, of means for supplying to the same cooling or heating liquid, a spindle and means for revolving the same, two sheet-metal vessels, one within the other, with a space between them for the passage of the liquid to be heated or cooled, there being a hollow hub in or connected with the spindle, with openings into the space between the two centrifugal vessels, a tubular opening for the passage of liquid from the tank into the inner centrifugal vessel, a valve for regulating the passage of liquid through such tubular opening, and mechanism for regulating the position of the valve, substantially as set forth.

3. The combination, with the liquid-holding vessel N and pipe O, of the tank A, the spindle B, passing through the bottom of the tank and having a flaring cup at the upper end, the sheet-metal vessel E, connected with the said cup, a hollow hub secured into the flaring cup, the sheet-metal vessel D, fastened to such hollow hub, the axial supply-pipe G, opening into the hollow hub, there being holes through the hollow hub into the space between the vessels D and E, the tube L, passing through the hollow hub and receiving liquid that passes through the opening 10 in the flaring cup, and the annular troughs or covers K and M around the upper ends of the respective centrifugal vessels D and E, substantially as set forth.

4. The combination, with the liquid-holding vessel N and pipe O, of the tank A, the spindle B, passing through the bottom of the tank and having a flaring cup at the upper end, the sheet-metal vessel E, connected with said cup, a hollow hub secured into the flaring cup, the sheet-metal vessel D, fastened to such hollow hub, the axial supply-pipe G, opening into the hollow hub, there being holes through the hollow hub into the space between the vessels D and E, the tube L, passing through the hollow hub and receiving liquid that passes through the opening 10 in the flaring cup, the annular troughs or covers K and M around the upper ends of the respective centrifugal vessels D and E, and a valve and mechanism for moving the same to regulate the quantity of liquid passing through the pipe L, substantially as set forth.

5. The combination, in a centrifugal cooling or heating apparatus, of two outwardly and upwardly flaring vessels parabolic in shape, and a shaft to which both vessels are connected and by which they are revolved, a surrounding stationary vessel for holding water, and means for admitting liquid to be heated or cooled to flow between the vessels in a thin layer, substantially as specified.

6. The combination, in a centrifugal cooling or heating apparatus, of an upwardly and outwardly flaring vessel parabolic in shape, a shaft with which such vessel is connected and by which it is revolved, and a surrounding stationary vessel for holding water, and means for supplying liquid into the bottom at the center of the centrifugal vessel, and a receiving-vessel around the upper edge of such revolving vessel, whereby the liquid within such vessel is spread in a nearly-uniform layer upon the interior of such vessel by the centrifugal action, and thus heated or cooled and then delivered from the upper edge, substantially as specified.

Signed by me this 14th day of September, 1891.

C. G. BJORLIN.

Witnesses:
GEO. T. PINCKNEY,
WILLIAM G. MOTT.